C. McCOMBIE.

Improvement in Clover-Harvesters.

No. 126,726.  Patented May 14, 1872.

Witnesses.  Inventor.

UNITED STATES PATENT OFFICE.

CHILSON McCOMBIE, OF CARROLLTOWN, PENNSYLVANIA.

IMPROVEMENT IN CLOVER-HARVESTERS.

Specification forming part of Letters Patent No. 126,726, dated May 14, 1872; antedated May 1, 1872.

*To all whom it may concern:*

Be it known that I, CHILSON McCOMBIE, of Carrolltown, in the county of Cambria and State of Pennsylvania, have invented a new and valuable Improvement in Clover-Harvesters; and I do hereby declare that the following is a full, clear, and exact description of the construction and operation of the same, reference being had to the annexed drawing making a part of this specification, and to the letters and figures of reference marked thereon.

Figure 1:
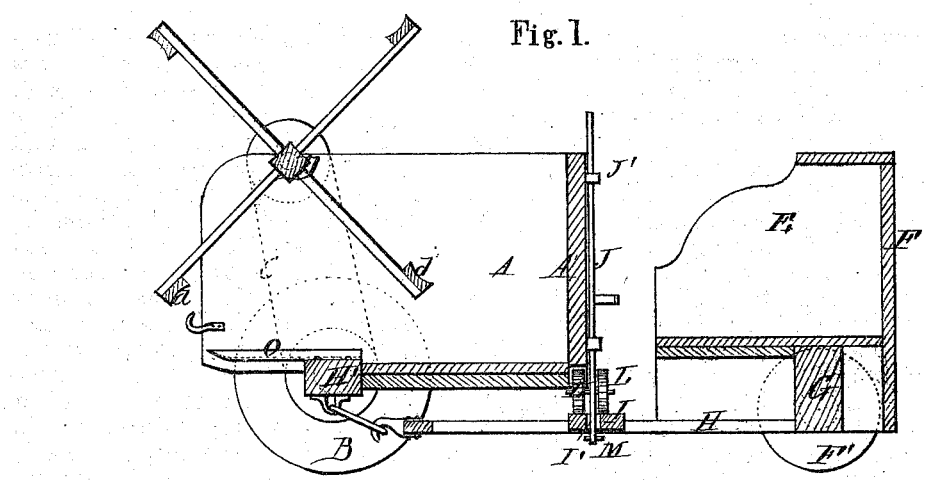
Figure 2:
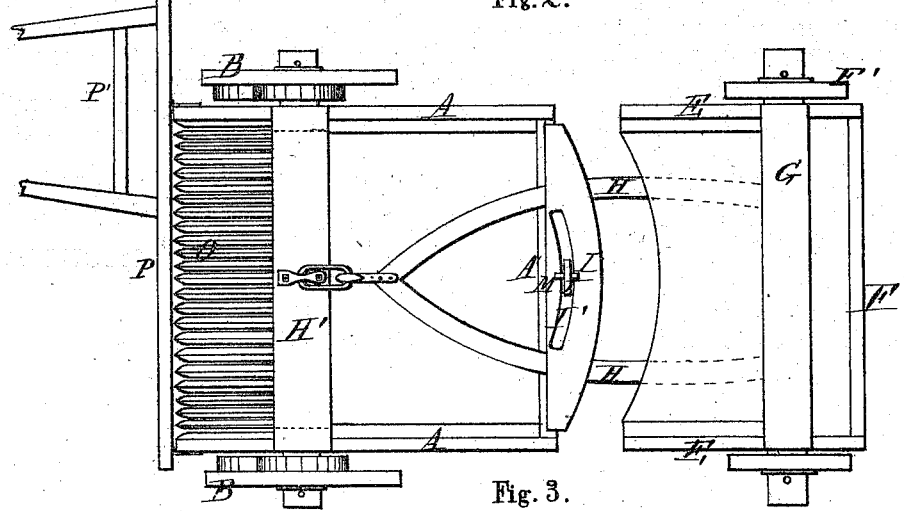
Figure 3:
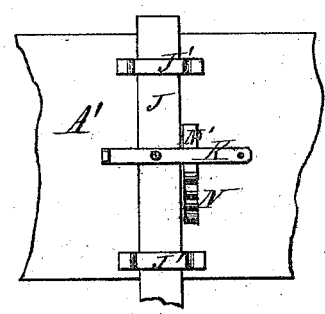

Figure 1 of the drawing is a representation of central vertical longitudinal section of my harvester. Fig. 2 is a top or plan view of the same. Fig. 3 is a detached view.

This invention has relation to certain improvements in clover-harvesters, as hereinafter described and claimed.

In the accompanying drawing illustrating this invention, A represents the sides, and A' the back of the harvester-frame, which is supported on driving-wheels B B, from which rotary motion is given by bands C to the reel D. The beaters $d$ of said reel are grooved longitudinally, so as to better enable them to gather the clover tops from the cutters. E indicates the sides, and F the back of the driver's sulky, supported on wheels F', from the stationary axle G of which two curved bars, H, reach forward, meet underneath the harvester, and are linked by the coupling shown to the stationary axle H' of it in such a manner as to allow the harvester and sulky to swing in different directions independently of each other. I designates a transverse bar secured across the bars H, and made with a curved slot, I', through which the lower end of a bar, J, passes. This bar is arranged to slide vertically through brackets J' attached to the back of the harvester, and is operated by a lever, K. It is provided with a pair of friction-rollers, L, which roll on the upper side of the bar I, when the harvester or sulky is swung around. M represents a small pin which holds the lower end of the bar J in place. N is a vertical rack on the back of the harvester, to receive the pawl N' attached to the bar J. By moving the lever K the back of the harvester is raised or lowered to regulate the pitch of the cutters O. P indicates a long transverse bar, to one side of which are attached the shafts P', said bar being so connected to the front of the harvester as to locate the draft to one side, so as to keep the horses from injuring the clover and preventing the access of the cutters thereto.

I claim as my invention—

The combination of the bars I J, lever K, rack N, pawl N', rollers L, substantially as specified.

In testimony that I claim the above I have hereunto subscribed my name in the presence of two witnesses.

CHILSON McCOMBIE.

Witnesses:
T. R. SCANLAN,
JOHN L. SCANLAN.